(12) United States Patent
Schuler et al.

(10) Patent No.: US 6,334,366 B1
(45) Date of Patent: Jan. 1, 2002

(54) DRIVING DEVICE FOR A ROLLOVER BAR

(75) Inventors: Eckart Schuler, Sindelfingen; Carsten Unruh, Filderstadt-Bernhausen; Frank Van de Poel, Rottenburg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/543,923

(22) Filed: Apr. 6, 2000

(30) Foreign Application Priority Data

Apr. 14, 1999 (DE) .......................................... 199 16 678

(51) Int. Cl.$^7$ ............................................... B60R 21/00
(52) U.S. Cl. ............................................... 74/2; 280/756
(58) Field of Search ............................... 74/2; 280/756, 280/748, 753; 296/112, 113, 117; 180/271

(56) References Cited

U.S. PATENT DOCUMENTS

| | | | | |
|---|---|---|---|---|
| 4,840,398 A | * | 6/1989 | Matthias et al. | 280/756 |
| 5,165,707 A | * | 11/1992 | Morimanno, Sr. et al. | 280/756 |
| 5,284,360 A | * | 2/1994 | Busch et al. | 280/756 |
| 5,626,361 A | * | 5/1997 | Heiner | 280/756 |

FOREIGN PATENT DOCUMENTS

| | | |
|---|---|---|
| DE | 37 32 561 C2 | 9/1987 |
| DE | 37 32 562 C1 | 9/1987 |
| DE | 39 25 513 C2 | 8/1989 |
| EP | 0 568 858 B1 | 4/1993 |

* cited by examiner

Primary Examiner—David Fenstermacher
(74) Attorney, Agent, or Firm—Crowell & Moring LLP

(57) ABSTRACT

A driving device for a rollover bar for motor vehicles has a piston-cylinder unit that, in a crash situation, extends the rollover bar out of a rest position into a supporting position. A further or second piston-cylinder unit is provided as an additional drive for the purpose of adjusting the first piston-cylinder unit. The influence of the further piston-cylinder unit on the first piston-cylinder unit can be cancelled in the presence of a crash signal. The piston of the first piston-cylinder unit has detent toothing formed on it which acts counter to a retraction movement of the first piston-cylinder unit and with which a controllable detent element is brought into engagement by means of a hydraulic cylinder in any extended position. A piston of the further piston-cylinder unit is held releasably in its retracted position by a controllable locking device. In addition to controlling the detent element, the hydraulic cylinder controls the locking device in such a way that the piston of the further piston-cylinder unit is released in the case of arbitrary extension from its rest position and is otherwise held in the said rest position by the locking device.

9 Claims, 2 Drawing Sheets

DRIVING DEVICE FOR A ROLLOVER BAR

Figure 1:
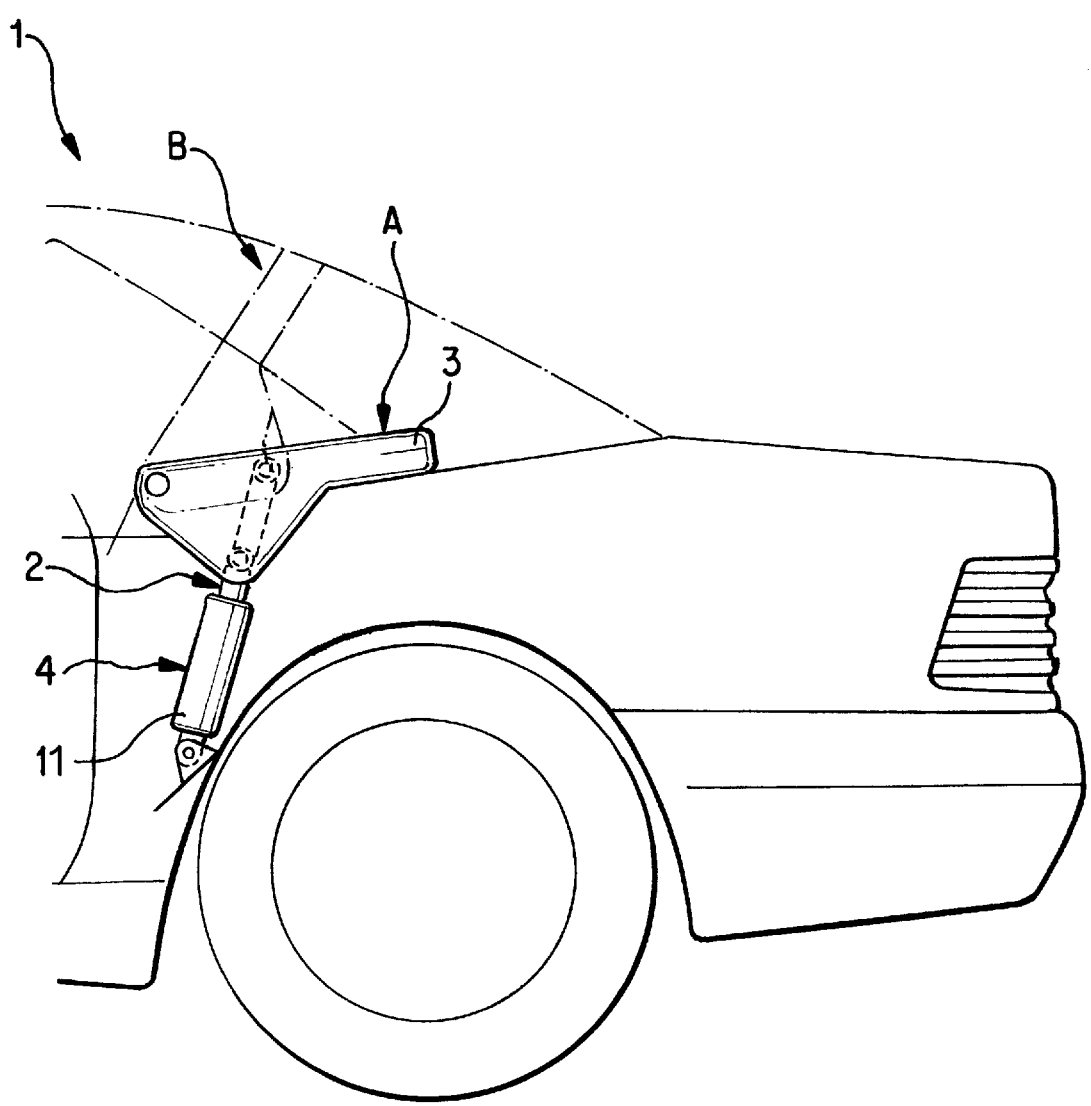

The invention relates to a driving device for a rollover bar.

DE 39 25 513 C2 describes a driving device for a rollover bar of a motor vehicle, in particular a convertible. By means of this driving device, the rollover bar can be displaced out of its lowered rest position into an upward-pointing supporting position and back again. For this purpose, the rollover bar is connected to a first actuating element, which can be actuated underneath by the action of a spring energy store and is controlled by a sensor, and a second actuating element, the direction of movement of which can be controlled arbitrarily. The two actuating elements are supported against the vehicle body, on which a retention device for the lowered rollover bar and an interlock device for the rollover bar in a supporting position are provided. The retention device comprises a retaining lever which, in the rest position, projects into the path of movement of the rollover bar and which can be pivoted out of this path. One end of this lever interacts with a corresponding retaining projection on this rollover bar, and the lever is actuated counter to a spring force by an actuating rod of a hydraulic cylinder. The retaining lever is a two-arm lever, one lever arm being assigned to the retaining projection of the rollover bar and the other lever arm being capable of being acted upon by the actuating rod.

However, the disadvantage here is that, if the motor vehicle is involved in a crash or rolls over, the rollover bar has to be released by the retaining lever before being displaced into its upward-pointing supporting position.

Another disadvantage is that it releases the force by means of a hydraulic actuator which operates particularly quickly and can be acted upon by means of an accumulator, actuators of this kind being limited in terms of their response time due to high viscosities of the pressure media employed. Under certain circumstances, extension of the rollover bar due to a crash can therefore be delayed.

Another driving device for a rollover bar for motor vehicles is described in DE 37 32 562 C1. This driving device has a piston-cylinder unit by means of which the rollover bar can be extended out of a lowered rest position into a raised supporting position in a crash situation. After controlled release of an interlock, a supporting piston is extended out of a guide cylinder by means of an ejection spring and interlocked again in the extended position. For the adjustment of the piston-cylinder unit, there is a further piston-cylinder unit as an additional drive, by means of which the direction of movement and speed of the spring-loaded supporting piston can be arbitrarily controlled. The influence of the further piston-cylinder unit on the supporting piston can be cancelled in the presence of a crash signal. A detent toothing which acts counter to a retraction movement of the supporting piston is furthermore formed on the supporting piston, and by means of this detent toothing a controllable detent element can be brought into engagement by means of a hydraulic cylinder in any extended position. A piston of the further piston-cylinder unit is held releasably in its retracted position by a controllable locking device.

However, this locking device has the disadvantage that its design configuration, production and assembly are involved and lead to high costs.

Refinements of a locking device of this kind are described in DE 37 32 561 C 2 and in EP 0 568 858 B1.

The object of the present invention is therefore to provide a driving device for a rollover bar by means of which the rollover bar can be locked in any extended position and by means of which it is possible to immediately raise the rollover bar into its supporting position in the event of an accident, its embodiment being extremely simple and economical.

According to the invention, the locking device is moved in such a way by the hydraulic cylinder, which is furthermore provided to actuate the detent element, that the piston of the further piston-cylinder unit is released during extension of the rollover bar out of its rest position and otherwise is held in the rest position by the locking device. This is done advantageously by way of preventing the piston of the further piston-cylinder unit and the rollover bar from creeping out of the lowered rest position of the rollover bar in the direction of the extended supporting position of the rollover bar in the event of low working pressure in the further piston-cylinder unit, an additional controllable actuating element for actuating the locking device and hence for releasing the piston being superfluous. This reduces the production costs for the driving device according to the invention, the outlay on assembly and the number of components.

In addition to simplified design, the driving device according to the invention has the advantage that the outlay on control and regulation for adjusting the rollover bar is significantly reduced.

Figure 2:
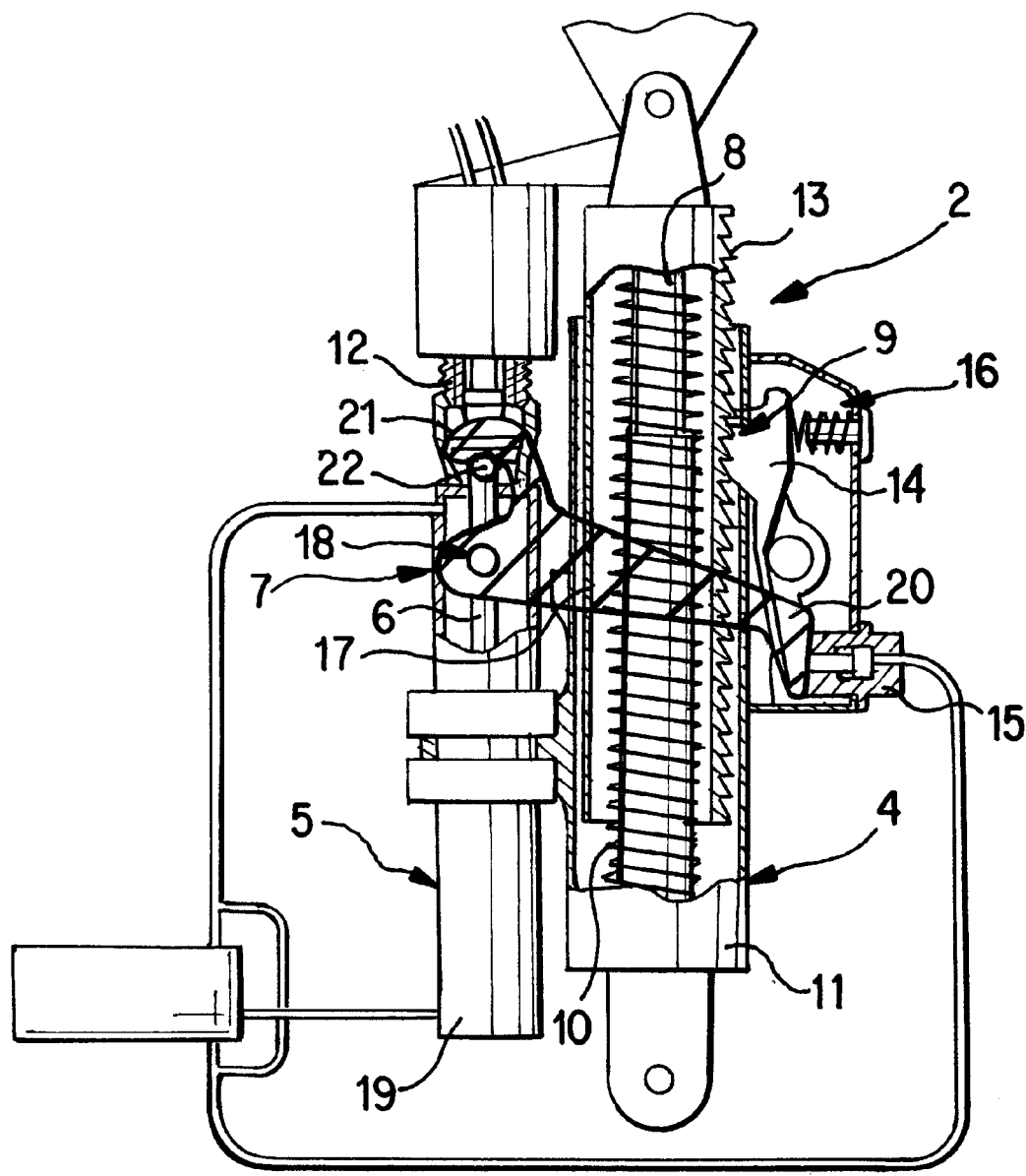

Further advantages and developments of the invention will emerge from the exemplary embodiment, which is described in principle below with reference to the drawings, in which:

FIG. 1 shows a rear part of a motor vehicle, in which a driving device for a rollover bar is arranged; and FIG. 2 shows the driving device in accordance with FIG. 1 with a piston-cylinder unit and a further piston-cylinder unit, a piston of the further piston-cylinder unit being held in a retracted position by a locking device.

FIG. 1 shows a rear part of a motor vehicle 1 in which a driving device 2 for a rollover bar 3 is arranged. The driving device 2 for the rollover bar 3 has a piston-cylinder unit 4. By means of the piston-cylinder unit 4, the rollover bar 3 can be extended in a crash situation out of a lowered rest position, which is illustrated in FIG. 1 at A, into a raised supporting position, which is shown in chain-dotted representation in FIG. 1 at B.

FIG. 2 shows the driving device 2 in accordance with FIG. 1, with the piston-cylinder unit 4 and a further piston-cylinder unit 5, a piston 6 of the further piston-cylinder unit 5 being held releasably in a retracted position by a locking device 7.

When the rollover bar 3 is extended owing to a crash, a supporting piston 8 of the piston-cylinder unit 4 is, after controlled release of a crash coupling 12, ejected out of a drive cylinder 11 by means of an ejection spring 10.

The further piston-cylinder unit 5 is provided as an additional drive for arbitrary adjustment of the piston-cylinder unit 4 by a driver of the motor vehicle 1. Here, the direction of movement and speed of the spring-loaded supporting piston 8 is controlled arbitrarily by the further piston-cylinder unit 5. In the presence of a crash signal, the influence on the supporting piston 8 can be cancelled by means of a coupling or crash coupling 12 known from the prior art which is arranged above the locking device 7 in the direction of extension of the piston 6 of the further piston-cylinder unit 5.

The connection between the piston-cylinder unit 4 and the further piston-cylinder unit 5 can thus be released independently of the locking device 7. This ensures that, in the event of a crash or if the motor vehicle 1 rolls over, the rollover bar 3 is displaced into its supporting position by the piston-cylinder unit 4 and not hindered by the locking device 7, despite the fact that the piston 6 of the further piston-cylinder unit 5 is locked.

A rectilinear detent toothing 13 which acts counter to a direction of retraction of the rollover bar 3 is formed along a lateral surface of the supporting piston 8. A controllable detent element 14 of an interlock 9 can be brought into engagement with the detent toothing 13 in any position of extension or retraction of the rollover bar 3.

A single-acting hydraulic cylinder 15 is provided for the purpose of lifting the detent element 14 out of the detent toothing 13 counter to a spring force of a spring device 16. The spring device 16 assigned to the detent element 14 pivots the detent element 14 back into engagement with the detent toothing 13 when the cylinder 15 is depressurized. By means of this measure, the rollover bar 3 can be fixed in any position counter to a direction of retraction, thus offering protection for passengers in the motor vehicle 1 should the motor vehicle 1 roll over, even when the rollover bar 3 is not completely extended.

In addition to the detent element 14, the hydraulic cylinder 15 controls the locking device 7 in such a way that the piston 6 of the further piston-cylinder unit 5 is released in the case of arbitrary extension out of its rest position. Otherwise, the piston 6 is held in its rest position by the locking device 7.

In the present exemplary embodiment of the locking device 7 in accordance with FIG. 2, this locking device has a detent member 17. The detent member is designed as a two-armed lever which is mounted pivotably on a cylinder 19 of the further piston-cylinder unit 5 by means of a rotation device 18. One end of a first lever arm 20 can be actuated by the hydraulic cylinder 15. One end of a second lever arm 21 can be guided in such a way over a pin 22, which is arranged on a head of the piston 6, in the direction of extension of the piston 6 of the further piston-cylinder unit 5 that the pin 22 rests against the second lever arm 21, which is of hook-shaped design. In this position, the piston 6 of the further piston-cylinder unit 5 is held counter to its direction of extension by the lever 17.

That end of the first lever arm 20 of the lever 17 which rests against the hydraulic cylinder 15 is arranged in such a way between the detent element 14 and the hydraulic cylinder 15 that the lever 17 can be pivoted out of its locking position by the hydraulic cylinder 15, counter to a spring force of the spring device 16, and can be displaced back into its locking position by the spring device 16 when the cylinder 15 is depressurized.

During the extension and retraction of the hydraulic cylinder 15, the detent element 14 and the lever 17 are actuated simultaneously by the said cylinder, with the result that both are moved out of engagement.

In another embodiment (not shown) of the locking device which differs from the present exemplary embodiment, provision can be made for the said device to be mounted pivotably on the guide cylinder 11 of the piston-cylinder unit by means of a rotation device and for the rotation device to have a bearing journal connected to the guide cylinder. A bearing bushing which is connected to the detent member of the locking device is pushed over the bearing journal. To ensure that the detent member cannot be released unintentionally in the axial direction of the bearing journal, a split pin is provided in the region of the free end of the bearing journal and pushed through a hole in the bearing journal.

In another embodiment (not shown) of the locking device, provision can be made for the detent member itself to be provided with a spring against the spring force of which the detent member is displaced out of its locking position by the hydraulic cylinder and guided back into its locking position when the cylinder is depressurized.

Common to all the embodiments described above is the fact that the rollover bar 3 is displaced into its supporting position B by the ejection spring 10 if the motor vehicle 1 is in a crash situation or rolls over. In this case, the hydraulic cylinder 15 is not subjected to pressure, for which reason the detent element 14 remains in continuous engagement with the detent toothing 13. Owing to the alignment of the individual teeth, this toothing slides along the detent element 14 and provides an effective locking action against a retraction movement of the rollover bar 3.

By virtue of the arrangement of the lever 17 and the detent element 14, interaction between these is excluded during the extension of the rollover bar 3 due to a crash, with the result that extension of the rollover bar 3 and also the locking action between the detent toothing 13 and the detent element 14 are assured in all cases.

What is claimed is:

1. A driving device for a rollover bar for a motor vehicle comprising:

a first piston-cylinder unit coupled to the rollover bar, the first piston-cylinder unit having a piston coupled to a cylinder;

a second piston-cylinder unit coupled to the first piston-cylinder unit for adjusting the first piston-cylinder unit;

an ejection spring coupled to the first piston-cylinder unit to extend the piston and cylinder of the first piston-cylinder unit to extend the rollover bar out of a lowered rest position to a raised supporting position in a crash situation;

a crash coupling that couples the first and second piston-cylinder units and prevents extension of the piston and cylinder of the first cylinder unit by the ejection spring and in a crash situation decouples the first piston-cylinder unit from the second piston-cylinder unit to permit the piston and cylinder of the first piston-cylinder unit to be extended by the ejection spring independent of influence of the second piston-cylinder unit;

an interlock coupled to the first piston-cylinder unit and movable from an engaged position where it prevents retraction of the piston and cylinder of the first piston-unit to a disengaged position where it permits the piston and cylinder of the first piston-unit to be retracted;

a locking device coupled to a piston and cylinder of the second piston-cylinder unit and movable between an engaged position and a disengaged position, the locking device preventing the piston and cylinder of the second piston-cylinder unit from extending from a rest position when in the engaged position and permitting the piston and cylinder of the second piston-cylinder unit to extend from the rest position when in the disengaged position; and an actuator coupled to the interlock and locking device for simultaneously actuating the interlock and locking device to move between their engaged and disengaged positions.

2. The driving device of claim 1 wherein the interlock comprises detent toothing formed on the piston of the first piston-cylinder unit in a direction counter to retraction movement of the piston of the first-piston cylinder unit and a detent element movable between the interlock's engaged position where the detent element engages the detent toothing formed on the piston of the first piston-cylinder unit and to the interlock's disengaged position where the detent element is disengaged from the detent toothing; the actuator comprising a hydraulic cylinder coupled to the interlock and locking device for simultaneously moving the second interlock and locking device between their engaged and disengaged positions when the hydraulic cylinder extends and retracts.

3. The driving device of claim 2 and wherein the locking device includes a detent member which, when the locking device is in its engaged position, at least partially surround a pin arranged on the piston of the second piston-cylinder unit.

4. The driving device of claim 3 and further including a spring coupled to the locking device for urging the locking device into its engaged position.

5. The driving device of claim 3 wherein the detent member of the locking device is pivotably mounted on the cylinder of the second piston-cylinder unit.

6. The driving device of claim 3 wherein the detent member of the locking device is pivotably mounted on a guide cylinder of the first piston-cylinder unit.

7. The driving device of claim 3 wherein the detent member of the locking device is a lever including first and second lever arms with an end of the first lever arm coupled to the hydraulic cylinder of the actuator.

8. The driving device of claim 7 wherein an end of the second lever arm member contacts the pin arranged on the piston of the second piston-cylinder unit when the locking device is in its engaged position so that the piston of the second piston-cylinder unit is held against extension solely by the detent member of the locking device.

9. The driving device of claim 8 wherein the second lever arm is hooked-shaped where it contacts the pin arranged on the piston of the second piston-cylinder unit.

* * * * *